Sept. 27, 1966  HUNG CHI CHANG ETAL  3,275,415
APPARATUS FOR AND PREPARATION OF SILICON
CARBIDE SINGLE CRYSTALS
Filed Feb. 27, 1964  3 Sheets-Sheet 1

INVENTORS
HUNG CHI CHANG
LEONARD J. KROKO
BY
Frederick Hapor
ATTORNEY

INVENTORS
HUNG-CHI CHANG
LEONARD J. KROKO
BY
ATTORNEY

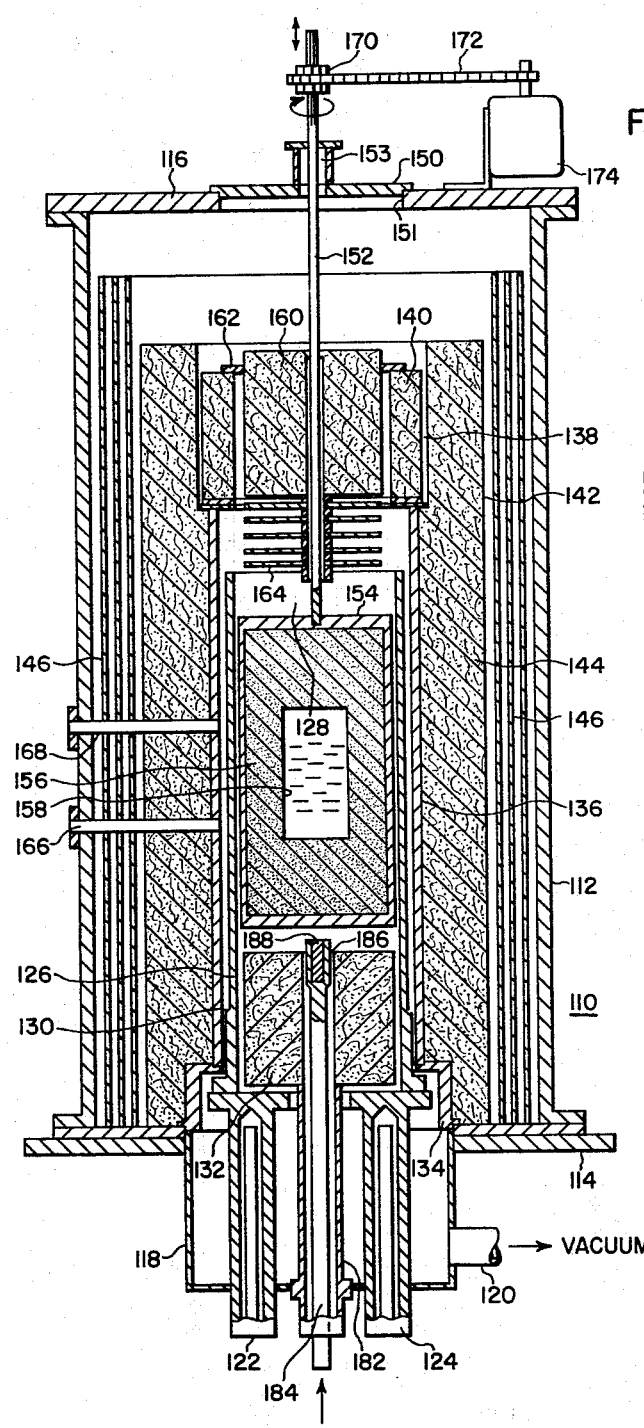
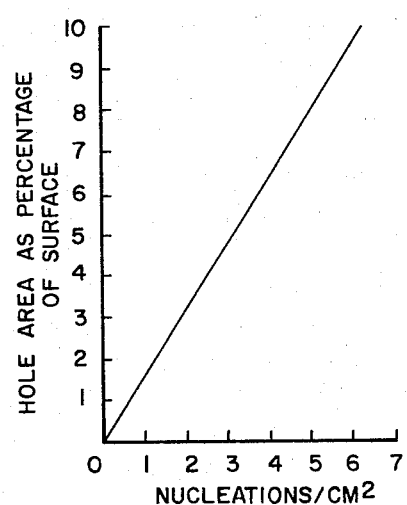

3,275,415
APPARATUS FOR AND PREPARATION OF
SILICON CARBIDE SINGLE CRYSTALS
Hung Chi Chang, Pittsburgh, and Leonard J. Kroko, Pitcairn, Pa., assignors to Westinghouse Electric Corporation, Pittsburgh, Pa., a corporation of Pennsylvania
Filed Feb. 27, 1964, Ser. No. 348,900
8 Claims. (Cl. 23—208)

This application is a continuation in part of our U.S. patent application Serial No. 738,806, filed May 29, 1958, now abandoned.

This invention relates to the preparation of single crystals from the vapor phase of compounds that decompose such, for example, as silicon carbide, and in particular it concerns novel apparatus and methods for preparing such single crystals.

There are many compounds of potential interest for use in semiconductor applications that may be subjected to high temperatures. Many of these are "decomposing" compounds, and the ordinary methods of growing single crystals are not applicable to them. By "decomposing" compounds we intend to indicate compounds that sublime and evidence no liquid phase at ordinary conditions, or, stated otherwise, that exhibit a liquid phase, if at all, under conditions considered impractical for use of that phase; such compounds generally tend to decompose, at least in part, in the vapor state. Representative materials of this nature and to which the present invention applies include boron nitride, AlN, boron phosphide, gallium phosphide and silicon carbide.

A recent publication, Ber. der Deutschen Keram. Ges. 320, 229–250 (1955), discloses a system for the production of single crystals of silicon carbide. The material is grown from the vapor phase in the form of hexagonal platelets in a cavity defined by a mass of silicon carbide. It is a characteristic of that system that a very large number of silicon carbide single crystals are formed in the cavity during a single operation. However, with a fixed growth area and lack of control of the number of nucleation sites, the perfection and size of the resulting crystals are not considered to be of significant usefulness for commercial application. Not only are the crystals small, but they soon interfere with each other and grow together.

It is a primary object of the present invention to provide improved apparatus for the preparation of single crystals of decomposing compounds whereby large single crystals of high perfection can be prepared readily.

It is a further object of the invention to provide an apparatus for the preparation of single crystals of decomposing compounds in which a nucleation surface containing predetermined nucleation sites is provided.

Still another object is to provide apparatus for use in a single crystal furnace characterized in that concentrations of vapor of the desired crystal are produced at predetermined areas whereby single crystals can be nucleated and grown into large crystals.

A further object is to provide a method whereby single crystals can be grown from the vapor state that is simple and easily practiced and results in a large number of relatively larger single crystals of a high state of perfection.

An additional object is to provide an apparatus and method in accordance with the foregoing objects by which single crystals of silicon carbide can be readily prepared.

The invention will be specifically described hereinafter as it applies to the production of silicon carbide single crystals since the procedural, structural and theoretical considerations applicable thereto are of general applicability with respect to the other compounds that can be grown in single crystal form in accordance with this invention.

In accordance with our discoveries, single crystals are grown on a surface of a material other than the solid material comprising such single crystals, which surface is embedded in, or surrounded by, for example, a mass of silicon carbide, which is present for vaporization to supply vapors of the components to form the crystals. The surface acts as an artificial nucleation surface. Since the surface is not silicon carbide, the number of sites available for crystals to nucleate is minimized and in fact the tendency to form nuclei of silicon carbide therein is relatively low. Once a crystal nucleus is formed, however, the silicon carbide vapors condense thereon and the crystal grows rapidly. With a smaller number of crystals nucleated, the size and perfection of each single crystal which grows from the surface exceeds that heretofore obtainable. There is a great reduction in the number of intergrown or interfering crystals of silicon carbide.

The nucleation surface provided in accordance with our discoveries for growth of silicon carbide crystals in particular can be a surface of graphite that has a free space in front of it into which crystal growth can extend. We have found it convenient and advantageous to use a nonplanar or curvilinear symmetrical surface, particularly that presented by the inside surface of the wall of a hollow cylinder. Such a shape readily provides the necessary surface for crystal nucleation, provides free space into which crystals may grow, and disposed about its exterior is a mass of raw materials such as silicon carbide which surrounds the growth zone. Moreover, since the preferred material of construction for the hollow cylinder is graphite, certain grades are obtainable which are suitably pervious to silicon carbide vapors, the use thereof as well as its shape facilitates fabrication in preparing the apparatus in accordance with the invention.

The invention will be readily understood upon consideration of the discussion which follows in conjunction with the appended drawings in which:

FIG. 6 is a graph plotting the average number of nucleations per unit area against the percentage of holes in the surface of the hollow cylinder; and FIG. 7 is a cross-section of a modified form of furnace for practicing the invention.

Figure 1:
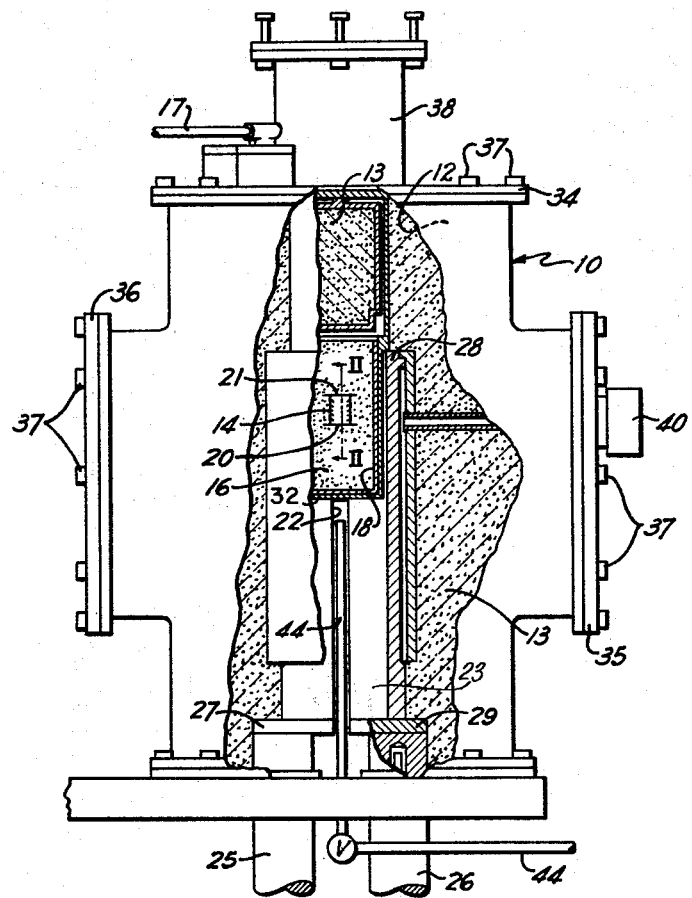
FIGURE 1 is a furnace, partly in section and partly in elevation, suitable for the production of single crystals of silicon carbide in accordance with our discoveries.

Referring now to the drawings, the furnace shown in FIG. 1 includes a vessel 10, suitably made of a heat resistant metal capable of being substantially gas tight at elevated temperatures. The inside surface 12 of vessel 10 is heat insulated as by having a mass 13 of fine particles of carbon or graphite disposed against it, or graphite felt.

The vessel 10 can be any shape desired. We have found it advantageous for control purposes and ease of charging, discharging and maintenance to provide entry ports along each side and the top. These can take the form of manhole entry ports having covers 34, 35 and 36 which are attached to vessel 10 in a substantially gas-tight relationship by means of bolts 37 and suitable gaskets or the like (not shown). Extending upwardly from the top of manhole cover 34 is a cylindrical charging chamber 38. This charging chamber is slightly larger in diameter than the container holding the raw materials and the nucleation cylinder so that the container may be conveniently inserted or withdrawn from the furnace. A sight tube 40 extending from one side of vessel 10 may be provided for making radiation temperature measurements and the like. Conventional vacuum pump means (not shown) may be attached to line 17 for evacuating the vessel to a high vacuum, e.g. on the order of $10^{-6}$ mm. of mercury.

The crystals are grown in accordance with the present invention in a vacuum or in the presence of argon or other gas that is inert to silicon carbide. This inert gas also can serve as a carrier for a significant conductivity doping impurity as will be explained hereinafter. To admit the gas, a valved tube 44, suitably extending to an outlet within the heater, is provided.

Centrally disposed in the vessel 10 is a thin-walled, hollow cylinder 14. Surrounding the cylinder 14 is a mass 16 forming a charge of raw materials. These can be silicon carbide particles, such as commercial silicon carbide crystals, or a mixture of elemental silicon and carbon, or both. For the best results the raw material mass should be packed as densely as possible. Finely divided silicon carbide, for example, 20 mesh to 100 mesh fineness, packed in tightly has a high density. One of the advantages of the apparatus of this invention is that its operation is not restricted to the use of silicon carbide as a source of vapor, although that can be used. Thus elemental silicon and carbon may be used in place of silicon carbide. Silicon and carbon are commercially available in hyper-pure form; consequently, with the use of pure carbon and silicon fewer undesirable impurities enter the system than when the usual commercial silicon carbide crystals are used. Silicon and carbon will react to provide silicon carbide prior to reaching operating temperatures and consequently vapors of silicon carbide will be evolved from the mass 16.

Cylinder 14 is made of commercially available, high purity graphite, as by machining such a shape from a block of graphite. A graphite cylinder facilitates control of the temperature gradient in the crystal growth area. Moreover, it provides a smooth, near isothermal surface for nucleation by virtue of its comparatively high coefficient of thermal conduction. As a practical matter, shapes other than cylindrical can be used for these purposes. However, a shape that defines a symmetrical cavity, and preferably a circular cylindrical shape, is desirable to facilitate both fabrication thereof and maintenance of temperature control during use. Graphite discs 20 and 21 are provided at the ends of the cylinder to prevent the raw materials from entering into the nucleation area.

The wall of the cylinder 14 is relatively dense but sufficiently porous or rendered pervious to permit the passage of predetermined amounts of the silicon carbide vapor. The wall thickness suitably is relatively thin, generally being on the order of about 2 to 12 mils. The actual size of the cylinder 14 being used depends on such factors as the size of the furnace, the character of the heating means and similar considerations.

A coarse grained graphite cylinder having a high gas permeability of 0.018 Darcy, for example that sold as CCV grade graphite whose average grain size is about 0.006 mm., having walls from 0.008 to 0.010 inch thick gave excellent results. Silicon carbide vapors penetrated the walls to the desired extent and when opened after operation of the furnace a good, spaced distribution of extremely large silicon carbide crystals covered the central portion of the inner walls. A much denser grade of graphite, CMB grade, consisted of extremely fine grains of an average of 0.003 mm. and was relatively impermeable to passage of silicon carbide vapors until the wall thickness was below 0.005 inch thick. Problems arise in making and handling a graphite vessel with walls this thin, and consequently the less dense, coarser grained graphite cylinders will be preferred. Graphite bodies of densities of 1.73 to 1.50, of an average grain size of 0.004 to 0.016 mm., and a gas permeability of 0.005 Darcy or more will result in good cylinders.

However, fine holes can be drilled through a cylinder made from any grade of graphite to permit passage of silicon carbide vapors to the interior. In such cases, the wall thickness is not particularly critical. This feature will be set forth in detail subsequently.

The mass 16 of raw materials including the cylinder 14 is disposed in a container 18, such as a carbon crucible, to provide support for the outside surface of the raw material mass. About the container 18 is a hollow carbon tube 23 that is provided with a slot 22 along most of its length to divide it into halves 27 and 29 joined at one end 28. Electrodes 25 and 26, respectively, are connected to the halves of that tube. This carbon tube 23 constitutes a heating means and is of a character that is capable of subliming silicon carbide, i.e. reach a temperature of about 2600° C. or higher. Current may be passed in one side, as through electrode 25 into one portion 27, through their connecting line 28 at the top and then out through the remaining half 29 and electrode 26.

The hot zone in the described heater is located at its upper end near the point at end 28 where the current path reverses, or passes between the halves. By making the heating means in this manner, a minimum of power is required to attain a given temperature. A tubular liner 32 of high density graphite is provided inside the heater to protect the latter from vapors produced in the process.

Figure 2:
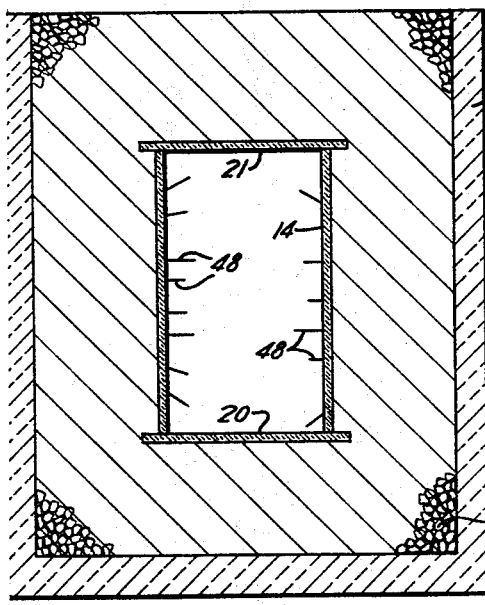
FIG. 2 is a section, taken along line II—II of FIG. 1 but to a larger scale, showing the nucleation surface disposed in a surrounding mass of silicon carbide raw materials.
Figure 3:
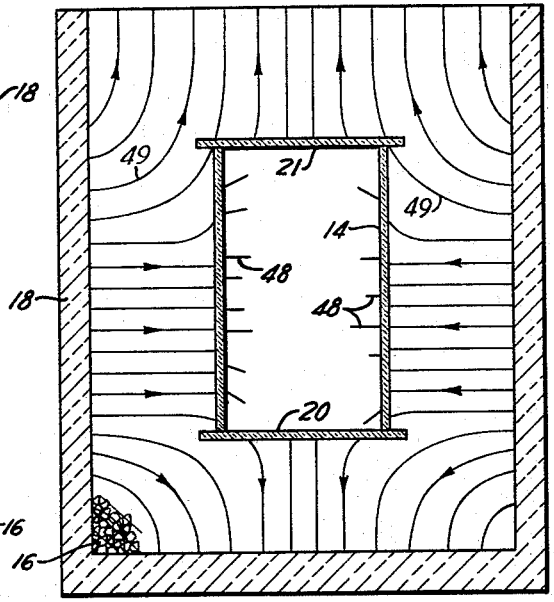
FIG. 3 shows, by means of arrows, the paths of heat flow in the nucleation zone of apparatus of this invention.

It will be noted that the heating means shown surrounds the side wall of the cylinder 14 and extends beyond its ends a susbtantial distance. Referring to FIGS. 2 and 3, this disposition of the heating means along with the character of the nucleation zone material contribute to the development of crystal growth lines, or heat flow lines, having relatively long straight portions at the center of the hollow cylinder 14. The result of this is shown by the growth disposition of the single crystals, represented by lines 48, in FIG. 2. It is also shown by the heat paths 49 shown in FIG. 3. From FIG. 3 it is apparent that the side wall of the cylinder 14 is hot and the ends 20 and 21 thereof are cooler, relatively speaking. Consequently, heat from the heater flows towards the side wall, into the cylinder and then to the lower temperature zones, or the ends 20 and 21 of the cylinder. In this connection, it should be noted that the heat means encircles the cylinder, at a distance, and is so located with respect to the cylinder that the lowest temperature at every plane across the cylinder coincides with the longitudinal axis of the cylinder.

Vapors of silicon carbide will preferentially condense on nuclei or surfaces of the growing crystals of silicon carbide and thereby produce flat single crystal platelets whose size will increase as the furnace is operated until the charge 16 is substantially dissipated. The distribution of the silicon carbide platelets on the inside walls of the cylinder 14 is normally such that the center half of the cylinder, for example, the central portion extending 1.5 to 2 inches in a 3 inch long cylinder, will contain most of the crystal growth consisting of large and the most perfect crystals, growing perpendicularly to the wall, while a small region at each end of this central portion will have smaller silicon carbide platelets which are directed at an angle towards the ends of the cylinder, and the last half inch or more at each end of the cylinder has no platelets growing thereon.

These heat flow lines 49, shown in FIG. 3, indicate the preferred direction of growth of single crystals since crystal growth proceeds on the temperature gradient lines, that is, in a direction perpendicular to the iso-thermal lines. Hereinafter "temperature gradient" is a line perpendicular to the isothermal lines. If a crystal begins to grow and after a time reaches a point where the temperature gradient is not along the line of growth or more than about 10 degrees out of line, a new crystal layer will form and grow along that gradient until it, too, encounters a substantial change in maximum gradient whereupon another new plate will form and so on. To grow single crystal planar platelets, it is necessary to maintain a maximum temperature gradient along the desired growth line. The disposition of the heating means and the character of the nucleation cylinder, or other symmetrical shape, in this invention provide a set of long growth lines quite similar to the heat flow or temperature gradient lines in FIG. 3. This fact has been corroborated through experience in using our apparatus.

The use of the invention may be better understood by reference to a specific application thereof. A furnace as shown in FIG. 1 was used. Previous to assembling the carbon or graphite parts, each part can be baked for a few minutes at above about 2700° C. in an argon-chlorine gas mixture or other atmosphere capable of removing undesirable impurities. By this practice it is possible to reduce substantially all impurities to minimum concentrations.

A graphite crucible 3 inches in diameter and 5 inches high was packed along its bottom portion with a dense layer of finely powdered pure silicon carbide, though a homogeneous mixture of commercially available high purity powdered elemental silicon and carbon is also usable. A graphite cylinder, approximately 2 inches long and 1.25 inches in diameter and having a wall thickness of 0.010 inch, was placed on a graphite disc laid on the silicon carbide layer. The graphite cylinder was prepared from a relatively porous, coarse grained graphite block. A second graphite disc was laid on the top thereof. Then the crucible was filled completely with additional quantities of the silicon carbide powder. The prepared crucible was lowered into the furnace and the furnace was closed. The furnace was then evacuated to about $10^{-6}$ mm. of mercury to remove impurities.

The temperature change during the operation of the furnace suitably consists of four periods; namely, degassing, nucleation, growth, and annealing. At the beginning of a run, the furnace is heated as rapidly as possible under high vacuum to a temperature of from 1300° C. to 1800° C. If a silicon and carbon mixture is employed after the temperature of the hottest part of the crucible reaches about 1400° C., below the melting point of silicon, the temperature is maintained constant for about 15 minutes. At this temperature, the silicon and carbon remain unreacted or react only partly. Any volatile impurities contained in the furnace which are evolved at these temperatures are removed with the aid of the vacuum being drawn. After the preliminary degassing period the temperature is raised slowly to 1800° C. in about 35 minutes and commercially available pure argon is then introduced through tube 44 which assists to suppress volatilization of silicon. During this period, silicon and carbon react to form silicon carbide and degassing continues. This last degassing period takes about an hour. With silicon carbide present originally, the temperature is raised to about 1800° C. at once, and maintained for about an hour to accomplish thorough degassing.

The next period is nucleation. The temperature of the crucible is raised from below 2000° C. to about 2500° C. in about 10 minutes. The silicon carbide around the graphite cylinder will volatilize rapidly. Nucleation starts on the inner walls of the graphite cylinder substrate as the vapor becomes supersaturated inside the cylinder 14, which occurs as a consequence of the rapid heating and the fact that the temperature inside of the cylinder will lag behind the heater temperature. The degree of supersaturation of the silicon carbide vapor in the cylinder decreases as the cylinder temperature rises and the applied electrical current to the carbon tube heater 23 is cut back to lower the temperature of the raw material mass slightly, and the vapor concentration soon becomes low enough in the cylinder 14 to stop further nucleation and in some cases, a few nuclei may revaporize. At this time, the temperature of the crucible is maintained constant at about 2500° C. Silicon carbide crystals grow inside crucible 14 at a slow speed. The growth period usually takes up to 100 hours to produce crystals of 1 centimeter width or diameter.

The last period is annealing. It is advisable to cool the furnace slowly, for instance over a period of four to five hours in order to avoid any strain being produced in the crystals. After the furnace is cooled the crucible is removed and the cylinder 14 is broken apart to obtain the single crystals produced in the cylinder.

In growing single crystals in a cavity defined by silicon carbide, as in the Lely article hereinbefore identified, a very large number of crystals result because the silicon carbide is a preferred nucleation site and numerous nuclei result. Within that mass of grown crystals, a few moderately satisfactory crystals occasionally may be found and recovered for use in constructing a semiconductor device. However, most, and sometimes all, of the crystals are obviously impure and are imperfect or too small to use since they tend to grow into contact with one another and cease growing while still minute. Such crystals also are characteristically irregular in shape and otherwise far from perfect according to our experience.

In contrast to those results, in the present invention it frequently occurs that the majority of crysals grown in a single run attain a particularly satisfactory size, e.g. one quarter inch to one half inch or more in diameter and 10 to 30 mils in thickness, and a state of perfection that permits their use in forming semiconductor components. The crop of crystals obtained though less than about half the number produced when the nucleation cylinder is omitted and often one tenth as numerous, comprises a far higher proportion of crystals suitable for semiconductor use. Since a far greater number of the resulting crystals produced on the present apparatus can be used for semiconductor devices, and each crystal is not only much larger but of optimum quality, it is apparent that this invention is distinctly advantageous with regard to the total area of usable silicon carbide crystals. Measurements on selected p-type and n-type crystals prepared in this invention have shown resistivities on the order of $5 \times 10^6$ and $1 \times 10^6$ ohm-cm., respectively, at room temperature. Moreover, substantially all of these crystals are readily recoverable since the bond between them and the graphite cylinder is not as hard to break as between a crystal and a lump of silicon carbide raw material.

When substantially pure argon, or other inert atmosphere, is used during crystal growth, the conductivity type, if any, of the resulting crystals if no controlled doping is applied, is determined by the impurities present in the raw materials. By selecting the purest raw materials, intrinsic silicon carbide crystal platelets have been successfully produced. The intrinsic silicon carbide is practically clear or relatively colorless. However, predetermined type conductivity crystals, or crystals with p and n regions in selected order, can be obtained in using this invention by, for example, adding to the argon a small amount of impurity from either Group III or Group V of the Periodic Table, as in the form of a chloride. Of course, conditions are maintained to prevent condensation of the doping agent in the argon conduit. Alternatively and preferably, a solid rod of the impurity as such rather than in compound form can be inserted in the argon tube to within the heater area, whereupon it will vaporize and be entrained by the argon. Also it is possible to insert a crucible containing the conductivity impurity in molten form into the gas tube 44 whereupon the impurity vaporizes and is carried into the nucleation cylinder. When doping is to be stopped, the rod or crucible simply is withdrawn. The timing of the introduction of a significant conductivity impurity can be used to produce a change in the conductivity type of the crystal. Experience with this invention has demonstrated that aluminum doping produces blue regions in the silicon carbide crystals, boron produces light blue or grey regions and nitrogen results in green regions.

The conditions to be maintained for crystal nucleation and for crystal growth are not the same. To nucleate a crystal requires a state of supersaturation of the vapor of the crystal at the nucleation site. As a practical matter, a high ratio of the supersaturation pressure to the equilibrium pressure at a given temperature is required to cause nucleation in most instances. Such a degree of supersaturation can be attained by a temperature differential within cylinder 14 as compared to the charge 16 on the order of 75° to 150° C. lower in the cylinder 14 at about 2500° C. After crystals of silicon carbide have nucleated on the walls of cylinder 14 and growth is desired, the temperature difference should be lowered to more nearly approach identity. Supersaturation to a slight extent, e.g., on the order of that resulting from a temperature differential of 0.1 degree to 10° or even 25° C. at about 2500° C. can be tolerated during growth, because such a small amount thereof will not cause additional crystals to be nucleated.

These partial pressure changes in the silicon carbide vapor are readily brought about in the present invention through manipulation of the heating means. For example, supersaturation is necessary at the initiation of the process to nucleate crystals. Accordingly, the heater temperature is turned up to high (full power) to generate a large vapor pressure before the temperature at the central portion of the graphite cylinder 14, at the growth zone, becomes nearly as high. Hence, the vapor entering the cylinder 14 will become supersaturated due to the lower temperature therein. After crystals are nucleated, the temperature differential is lowered so that a vapor pressure of silicon carbide in the cylinder 14 is only slightly greater than the equilibrium pressure for the temperature in the cylinder. This result flows naturally as a consequence of the rise in temperature of the graphite substrate and the lowering of the temperature on the raw material mass as the heater input is slightly reduced thereby making the equilibrium pressure and the supersaturation pressure of the silicon carbide vapor in cylinder 14 approach each other.

As previously indicated an important factor is the provision of adequate flow of silicon carbide vapors through the walls of the cylinder 14. While particularly good results have been obtained by making crucible 14 from a graphite having an average particle or grain size of 0.006 mm., a density of 1.62 and a gas permeability of 0.018 Darcy, the wall thickness being 0.008 inch, other graphite of considerably greater porosity can be employed. For example, good crystal growth was obtained on a highly porous graphite cylinder with walls of about 0.25 inch thick, the graphite being Grade 60 porous graphite of National Carbon Company, having a density of 1.05, 46.9% relative porosity with an average pore diameter of 0.0013 inch and an average air permeability at 70° F. of one cubic foot per square foot for a one inch thick plate at a pressure differential of 2 inches of water. The air was at 760 mm. pressure and 15% relative humidity.

Using dense graphite, for example, 1.76 and higher density, with an extremely fine grain size of 0.003 mm. or less, and a gas permeability of below 0.002 Darcy, crucibles of wall thickness of 10 mils or greater will grow no silicon carbide crystals. However, upon drilling a series of fine holes through the walls of such impervious graphite, excellent crystal growth was obtained. The number of silicon carbide nuclei was found to be directly proportional to the area of the holes up to 20% of the wall area of the cylinder. For each one percent of the surface being converted into holes, under conditions of operation of the apparatus, as outlined above, there are 0.625 nucleation per square centimeter of the inner surface of the cylinder, as an average.

Figure 4:
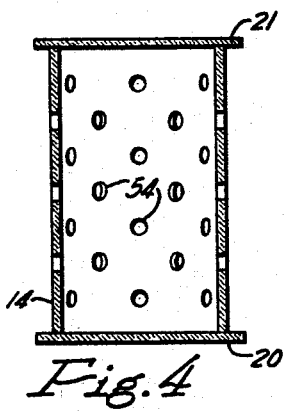
FIG. 4 shows, in section, an embodiment of a nucleation surface adapted to provide predetermined amount of perforations to admit vapors to the nucleation sites.

Referring to FIGURE 4, the cylinder 14 is provided with a series of holes 54 drilled therethrough in a uniform pattern.

Referring to FIGURE 6, there is plotted the number of nuclei formed, and consequently the number of crystals of silicon carbide grown, relative to the percentage of the wall area perforated. The holes may be as fine as desired, but are preferably of a diameter of from 0.005 to 0.025 inch. Holes much finer than 0.005 inch would require a high number to perforate even 1% of the surface of a cylinder, for example, nearly 3000 holes of a diameter of 0.002 inch are required per square inch of surface to give 1% area perforation.

The holes need not be all uniform in size, and in fact, a small number of holes of a diameter well above 0.025 inch can be drilled along with many smaller holes to give the desired results. However, no grossly large apertures, as for example 0.5 inch or larger, should be present since crystals can nucleate on the exposed silicon carbide outside the cylinder, and fine grains can fall into the cylinders. The holes may be uniformly distributed, or a higher concentration may be present at the central portion of the cylinder 14.

We have found that the total porosity of the walls may be correlated to the nuclei, and ultimately to the number of crystals of silicon carbide. The porosity formed inherently by the relative coarseness of the graphite grains and the density of the graphite, or by deliberately forming pores in the graphite either during its manufacture or by drilling or other mechanical means, follows the curve of FIG. 6 as to silicon carbide nuclei.

Utilizing the foregoing principles we have also discovered means by which nucleation surfaces having predetermined nucleation locations can be provided.

As noted hereinbefore, the graphite nucleation surface or interior of cylinder 14, is pervious with respect to the passage of silicon carbide vapors. In addition to the small holes 54, areas of greater permeability can be produced by making the desired locations thinner, and therefore more pervious to the vapor, than the remainder of the substrate. When the resulting structure is used, as described in the example, the silicon carbide vapors tend to concentrate adjacent to the holes or the highly pervious areas since that is the path of least resistance and more vapor is present there. Accordingly, the probability that a crystal will nucleate about the predetermined area is vastly increased. In actual tests it has been found that crystals nucleate at those areas preferentially to other sites on the surface.

Figure 5:
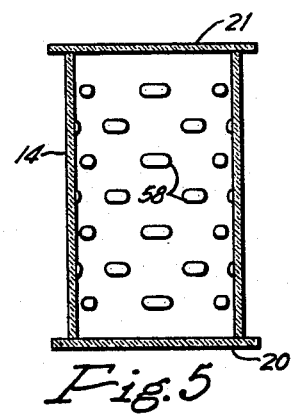
FIG. 5 is a cross-sectional view of another embodiment of the nucleation surface modified to provide predetermined nucleation sites.

We have also discovered that predetermined nucleation sites can be provided by providing a concentration of silicon on the inside surface of the graphite cylinder. Spots or strip films of silicon serve this purpose adequately. These conveniently are applied by painting dabs of silicon at the desired locations. As a result of the presence of these high local concentrations of silicon, concentrations of silicon carbide vapor develop at those sites and crystals are nucleated there preferentially to other areas on the surface where no such silicon concentration is present. While the silicon eventually vaporizes completely during the process, its evaporation is a rate phenomenon and enough silicon is present for an initial period of time that is adequate to bring about the initial nucleation. Once a crystal of silicon carbide is nucleated, the deposition of other molecules of silicon carbide will occur on the crystal in preference to starting a new crystal as a consequence of the change in the state of silicon carbide supersaturation as shown above. An embodiment of this invention is shown in FIG. 5 where silicon spots 58 are disposed on the inside surface of the cylinder 14. Of course, holes 54 may also be present in the walls of the cylinder in FIGURE 5.

A modified form of apparatus is shown in FIGURE 7, wherein the furnace 110 comprises a casing 112 mounted on a base 114 and provided with apertured cover 116. Depending from base 114 is an enclosure 118 to which a vacuum outlet 120 is attached to enable casing 112 to be evacuated. Electrodes 122 and 124 are supported from and pass through the walls of enclosure 118, and support thereon a split cylindrical heater element 126. The heater element 126 is split up to a short distance from its upper end 128 so that electrical current passes from electrode 122 to the left hand side of cylindrical heater element 126, thence to the upper end 128, then down the right hand side to electrode 124. The highest temperatures develop above the step 130 in heater 126 because the heater is thinner above this point and its resistance increases.

An electrically insulating block 132 comprising a shell of ceramic, for example, and filled with graphite felt, thermally insulates the electrodes 122 and 124 as well as any portion of enclosure 118 which can be water cooled by applying tubing carrying circulating water (not shown) about its exterior.

A fitting 134 attached to base 114 carries a cylindrical shell 136 of graphite, for example, on which at its upper end, rests an annular casing 138 filled with graphite felt 140. An outer thin walled shell 142 surrounds shell 136 and the space therebetween is filled with graphite felt 144 or lampblack or other refractory insulation. A series of radiation shields 146 of polished molybdenum surround the shell 142 and further reduce the heat loss.

Supported from cover 116 is a disk 150 hermetically closing aperture 151 thereon. Disk 150 is provided with a hermetical bearing 153 in which a shaft 152 of tungsten, for example, is mounted for both rotational and reciprocating movement. The shaft 152 extends downwardly and carries at its lower end a graphic crucible 154 assembled from threaded parts which carries a compact charge of silicon carbide 156 and symmetrically disposed therein a graphite cylinder 158 which is previous to graphite vapors, as is cylinder 14 previously described. The shaft 152 can be lowered so that cylinder 158 in crucible 154 has its horizontal axis of symmetry disposed at the center of the area of highest temperatures developed in heater 126.

Located above crucible 154 and fitting closely to the walls of annular casing 138 is a heat insulating member 160 closely but freely encircling shaft 152. The member 160 is provided with a flange 162 which enables it to rest on casing 138. At the lower end of casing 138 is supported a series of heat shields 164 of molybdenum. The member 160 may be split vertically so that it may be separated into two halves and removed from shaft 152. Upon pulling crucible 154 upwardly, the member 160 is also lifted up with it, and both can be removed through aperture 151.

Sight ports 166 and 168 which may be plugged with insulation until used, enable observation of the heater and also use of an optical pyrometer.

The shaft 152 is provided with a slidable drive 170 which engages the shaft, as by means of splines, to turn it under the force imparted by chain drive 172 operated by motor 174. The chain 172 may be removed when crucible 154 is being withdrawn from the furnace.

Sealed to enclosure 118 is a centrally disposed tube 182 within which a shaft 184 is disposed with a hermetically sealed joint to enable movement up and down therein. At the upper end of shaft 184 is a pocket 186 in which is placed a quantity of doping agent 188. By moving the pocket with a quantity of doping agent therein into a location adjacent crucible 154, the high temperatures will volatilize the doping agent and small amounts will penetrate the walls of the crucible and enter the growing crystals in cylinder 158.

From the foregoing it is apparent that the present invention provides novel apparatus of several different constructions of outstanding usefulness for the preparation of single crystals. In using this apparatus far greater numbers of useful single crystals of a high degree of perfection can be obtained in a single period than heretofore. Moreover, particular embodiments of the invention provide predetermined nucleation locations. Consequently, nucleation sites may be chosen with a view to growing crystals of desired size and shape for particular applications.

Another important advantage of the invention is that the thickness of the crystals can be easily controlled. As noted hereinbefore, the end portions of the nucleation area are cooler than the side walls. Accordingly, heat from the top and bottom surfaces of the crystal radiates towards those ends, thereby facilitating the condensing of the vapor to those surfaces of the crystal. By raising the end temperatures, heat loss from those surfaces of the crystal is lessened and the thickness of the crystal will increase very slowly. By lowering the temperature at the ends of the cylinder, the temperature difference is raised and heat radiates with greater rapidity thereby facilitating growth of the crystal in thickness. Temperature control in the foregoing manner may be accomplished through use of a heater having separately controlled areas or by using a single heater of a length with respect to the length of the cylinder to obtain the desired temperature differential.

While the invention has been described and illustrated with respect to the preparation of silicon carbide single crystals, it should be understood that it can be used in preparaing single crystals of other materials. For example, in preparing single crystals of gallium phosphide, the apparatus is used as just described but gallium phosphide, rather than silicon and carbon, is present as the raw material. The nucleation surface can perform in the same manner as just described. It should also be understood that in preparing such other crystals, the cylinder or nucleation surface may be made of materials other than graphite; for example, silicon carbide or quartz depending on their inertness at the operating temperatures, with respect to the particular compound involved, can be used.

In accordance with the provisions of the Patent Statute, the principle of the invention has been explained and there is described and illustrated what is considered to represent its best embodiment. However, it is to be understood that the invention may be practiced otherwise than as specifically illustrated and described.

We claim as our invention:

1. A furnace for growing single crystals of silicon carbide comprising a vessel, an empty hollow graphite cylinder with closed ends having porous walls disposed within said vessel, the vessel constructed to contain at least one material of the group consisting of silicon carbide and a mixture including silicon and carbon, the said material surrounding said graphite cylinder, silicon members disposed at preselected areas along the inside surface of the walls of said cylinder to form preferred nucleation sites for crystals of silicon carbide, and heating means disposed about said vessel to heat it and the contained material to a temperature sufficient to cause evolution of silicon carbide vapors, from the said material and passage thereof through the porous walls of the graphite cylinder whereby the vapors of silicon carbide can concentrate at the selected areas of the graphite cylinder into the hollow thereof.

2. A method for producing silicon carbide single crystals which comprises rapidly heating to the sublimation temperature of silicon carbide a mass of a material selected from at least one of the group consisting of silicon carbide and a mixture of silicon and carbon, there being a brief temperature dwell at about 1400° C. when the silicon and carbon mixture is employed, continuing the heating until a temperature of about 1800° C. is reached and degassing the mass at such last temperature, thereafter heating the mass to a temperature of from about 2000° C. to about 2500° C. whereby vapors of silicon carbide are produced, the said material surrounding an empty hollow graphite cylinder that is pervious to silicon carbide vapor, diffusing said vapor into the hollow of said graphite cylinder, maintaining the inside wall surface of said cylinder at a temperature below the temperature in said heated mass, whereby a supersaturated vapor of silicon carbide is produced at said surface and a relatively small number of single crystals of silicon carbide are nucleated thereon, then reducing the temperature of said mass of silicon and carbon whereby the degree of supersaturation of the vapor diffused into said cavity at said surface is lowered below the nucleation pressure and said nucleated crystals grow, and recovering the resulting relatively large crystals.

3. The process of claim 2 wherein a relatively constant temperature gradient is maintained during the period of the reduced temperature in the hollow cylinder such that the ends thereof are relatively cooler than the side walls so that perfection of the growing silicon carbide crystals is assured.

4. An apparatus for the preparation of relatively large single crystals of a decomposing compound, in combination, a casing containing a charge for producing vapors of the compound, heating means for heating the charge to a temperature at which vapors of the compound are evolved, a small empty hollow member having closed ends disposed in the charge so that the said vapors contact the walls of the hollow member, the walls of the hollow member having a porosity to admit passage of predetermined amounts of the said vapors into the hollow, the porosity being in an amount corresponding to holes passing through an otherwise non-porous wall in amount equal to from 0.1 to 20% of the wall area, the surface of the interior walls of the hollow member consisting of a material other than the said compound and characterized by being less favorable nucleation sites than the solid compound itself whereby a relatively small number of nuclei of the compound are formed on the interior walls of the hollow member and growth into the large single crystals is favored.

5. The apparatus of claim 4 wherein the hollow member comprises a hollow cylinder of graphite with graphite end disks, and the charge produces vapors of silicon carbide.

6. In a furnace of growing single crystals of silicon carbide, in combination, a cylindrical vessel constructed to contain a charge of a material selected from the group consisting of at least one of the group consisting of silicon carbide and mixtures of silicon and carbon, heating means disposed symmetrically about the vertical axis of the vessel whereby to heat a transverse portion of the charge to a temperature wherein vapors of the silicon carbide are evolved, said transverse portion being at a higher temperature than adjacent portions of the charge, a small empty hollow closed end cylinder of graphite disposed within the charge within the cylindrical vessel at the said transverse portion, the transverse portion intersecting the hollow graphic cylinder intermediate its ends, the walls of the hollow graphite cylinder being porous to the vapors of the silicon carbide whereby predetermined amounts of silicon carbide vapor penetrate through the graphite walls into the hollow space, the porosity of the walls being equal to that provided by holes passing through the graphite walls in an amount of 0.1 to 20% of the wall area, whereby a relatively small number of nuclei of silicon carbide will form on the interior walls of the hollow member and growth of large crystals of silicon carbide is favored.

7. The furnace of claim 6, wherein the cylindrical wall of the graphite cylinder is provided with fine holes of a diameter of the order of 0.005 to 0.025 inch in an amount of from 1% to 20% of the area of the cylindrical wall.

8. In the process for producing large single crystals of silicon carbide, the steps comprising preparing a mass comprising a stoichiometric mixture of silicon and carbon, disposing the mass about an empty hollow graphite cylinder having walls pervious to the passage of vapors of silicon carbide, heating the mass to a first temperature of about 1300° C. to 1400° C. but below the melting point of silicon and maintaining the mass at such first temperature for a period of time and subjecting the mass to a vacuum to remove volatile impurities, slowly increasing the temperature of the degassed mass to a second temperature of about 1800° C. and below 2000° C. the silicon and carbon reacting to form silicon carbide between 1300° C. and 1800° C., maintaining the mass at said second temperature and degassing the mass to remove volatile impurities, rapidly heating the mass to a temperature above 2000° C. to cause vapors of silicon carbide to be produced and to penetrate the pervious walls of the hollow graphite cylinder, the rapid heating causing an initial supersaturation of silicon carbide vapors in the hollow graphite cylinder whereby silicon carbide crystals nucleate on the inside walls of the graphite cylinder, and finally maintaining the temperature of the mass relatively constant at about 2500° C. whereby the silicon carbide nuclei grow to form large crystals of silicon carbide.

References Cited by the Examiner

UNITED STATES PATENTS

| | | |
|---|---|---|
| 1,054,372 | 2/1913 | Tone et al. |
| 1,450,464 | 4/1923 | Thomson. |
| 1,786,202 | 12/1930 | Fourment. |
| 2,402,582 | 6/1946 | Scaff _____ 23—223.5 X |
| 2,854,364 | 9/1958 | Lely. |
| 3,025,192 | 3/1962 | Lowe. |

OSCAR R. VERTIZ, *Primary Examiner.*

MAURICE A. BRINDISI, *Examiner.*

G. OZAKI, *Assistant Examiner.*